US009659182B1

(12) United States Patent
Roundy et al.

(10) Patent No.: US 9,659,182 B1
(45) Date of Patent: May 23, 2017

(54) SYSTEMS AND METHODS FOR PROTECTING DATA FILES

(71) Applicant: Symantec Corporation, Mountain View, CA (US)

(72) Inventors: Kevin Alejandro Roundy, El Segundo, CA (US); Sandeep Bhatkar, Sunnyvale, CA (US); Fanglu Guo, Los Angeles, CA (US); Scott Schneider, Sun Valley, CA (US)

(73) Assignee: Symantec Corporation, Mountain View, CA (US)

( * ) Notice: Subject to any disclaimer, the term of this patent is extended or adjusted under 35 U.S.C. 154(b) by 129 days.

(21) Appl. No.: 14/265,975

(22) Filed: Apr. 30, 2014

(51) Int. Cl.
*G06F 21/62* (2013.01)

(52) U.S. Cl.
CPC ................ *G06F 21/6218* (2013.01)

(58) Field of Classification Search
None
See application file for complete search history.

(56) References Cited

U.S. PATENT DOCUMENTS

| | | | | |
|---|---|---|---|---|
| 5,983,270 | A * | 11/1999 | Abraham | H04L 29/06 709/224 |
| 6,088,801 | A | 7/2000 | Grecsek | |
| 6,308,173 | B1 | 10/2001 | Glasser et al. | |
| 7,231,050 | B1 * | 6/2007 | Harris | G06F 21/6218 380/286 |
| 7,542,988 | B1 * | 6/2009 | Cook | G06F 9/44505 |
| 8,281,410 | B1 | 10/2012 | Sobel et al. | |
| 9,088,604 | B1 * | 7/2015 | Chen | H04L 63/1433 |
| 2002/0059425 | A1 | 5/2002 | Belfiore et al. | |
| 2005/0091655 | A1 | 4/2005 | Probert et al. | |
| 2006/0195914 | A1 | 8/2006 | Schwartz et al. | |
| 2007/0016952 | A1 * | 1/2007 | Stevens | G06F 21/51 726/24 |
| 2007/0101433 | A1 | 5/2007 | Louch et al. | |
| 2007/0260880 | A1 * | 11/2007 | Satterlee | G06F 21/51 713/164 |
| 2008/0120439 | A1 * | 5/2008 | Kwan | G06F 9/44505 710/13 |
| 2008/0209138 | A1 * | 8/2008 | Sheldon | G06F 21/6218 711/154 |
| 2010/0077445 | A1 * | 3/2010 | Schneider | G06F 21/52 726/1 |

(Continued)

OTHER PUBLICATIONS

"Microsoft Word", http://office.microsoft.com/en-us/word/, as accessed Feb. 27, 2014, Microsoft Corporation, (May 4, 2006).

(Continued)

*Primary Examiner* — Michael R Vaughan
(74) *Attorney, Agent, or Firm* — FisherBroyles LLP

(57) ABSTRACT

A method for protecting data files may include (1) identifying a data file to be protected against data loss, (2) identifying a set of software programs permitted to open the data file by (a) identifying a format of the data file and (b) identifying at least one software program capable of opening files of the format of the data file, (3) detecting an attempt to open the data file by a software program not included in the set of software programs, and (4) performing a security action in response to detecting the attempt to open the data file. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2010/0114959 A1* | 5/2010 | Shirakawa | .............. | G06F 21/62 707/781 |
| 2013/0346450 A1* | 12/2013 | Procopio | ............ | G06F 21/6218 707/783 |
| 2014/0033271 A1* | 1/2014 | Barton | .................... | H04L 67/10 726/1 |
| 2014/0344247 A1* | 11/2014 | Procopio | ............ | G06F 9/44505 707/722 |
| 2014/0351937 A1* | 11/2014 | Huang | .................. | G06F 21/564 726/24 |
| 2015/0180908 A1* | 6/2015 | Dang | ...................... | H04L 63/10 726/1 |

OTHER PUBLICATIONS

"Adobe Reader", http://get.adobe.com/reader/, as accessed Feb. 27, 2014, (Dec. 11, 2008).

"Xpdf", http://en.wikipedia.org/wiki/Xpdf, as accessed Feb. 27, 2014, Wikipedia, (Sep. 4, 2005).

"Windows", http://windows.microsoft.com/en-us/windows/home, as accessed Feb. 27, 2014, Microsoft Corporation, (Oct. 9, 2009).

"Windows API", http://en.wikipedia.org/wiki/Windows_API, as accessed Feb. 27, 2014, Wikipedia, (Nov. 28, 2003).

"Perforce Clients & Integrations", http://www.perforce.com/product/components/perforce-clients-integrations, as accessed Feb. 27, 2014, Perforce, (2014).

"RARLAB", http://www.rarlab.com/, as accessed Feb. 27, 2014, (May 23, 2002).

\* cited by examiner

SYSTEMS AND METHODS FOR PROTECTING DATA FILES

BACKGROUND

Targeted threats are a growing problem in the world of information security. Sometimes referred to as advanced persistent threats (APTs), targeted threats may include stealthy and continuous hacking processes, orchestrated by groups that are capably of effectively targeting a specific entity. APTs may originate from nation-states or organized crime and may threaten the security of an organization in a variety of ways. Sensitive data is commonly targeted, causing monetary and reputation damages to affected organizations. APTs may be designed to steal intellectual property, financial details of customers and employees, organizational strategy information, or any other type of confidential data. APTs may also be designed to destroy valuable data or sabotage computer-controlled systems. The operations of an APT may involve modifying sensitive files, such as configuration files or operating system files, for the purpose of establishing backdoors, escalating privilege, or otherwise weakening security systems.

System administrators often have trouble identifying or detecting targeted threats, since the behavior of these attacks often appear to be similar to the behavior of legitimate non-malicious users. Targeted threats may involve the same or similar commands and applications used by legitimate, non-malicious users to use or manage systems, in an attempt to mask illegitimate traffic and/or behavior, potentially frustrating the efforts of system administrators to distinguish between the same.

Attempts to detect and intercept stolen confidential data at points where the organization connects to the outside world may prove ineffective, in part due to the volume of data to be scrutinized, but also because by the time confidential data reaches that point it may have been extracted, compressed, encrypted, and possibly even concealed within non-confidential data. Accordingly, the instant disclosure identifies and addresses a need for additional and improved systems and methods for protecting data files.

SUMMARY

As will be described in greater detail below, the instant disclosure describes various systems and methods for protecting data files by identifying programs that may be authorized to open the data files and detecting when an unauthorized program attempts to open the files. Systems and methods described herein may also retrieve reputation data from a reputation database to determine whether a process involved in opening data files is trustworthy. If these systems and methods determine that an unauthorized or untrustworthy software program has attempted to open a data file, various security actions may be initiated.

In one example, a computer-implemented method for protecting data files may include (1) identifying a data file to be protected against data loss, (2) identifying a set of software programs permitted to open the data file by (a) identifying a format of the data file and (b) identifying at least one software program capable of opening files having the format of the data file, (3) detecting an attempt to open the data file by a software program not included in the set of software programs, and (4) performing a security action in response to detecting the attempt to open the data file.

In some examples, identifying the set of software programs may include identifying a software program that created the data file. In some examples, identifying the set of software programs may include: (1) monitoring software program usage of at least one user and (2) while monitoring the software program usage (a) identifying a software program used by the user to open the data file and (b) identifying a set of expected calling processes that resulted in opening the data file. In some examples, identifying the format of the data file may include: (1) identifying a file type for the data file, where the file type is used by an operating system of the computing device for the data file and (2) identifying the format of the data file by identifying a data file format associated with the file type.

In some examples, identifying the set of software programs may include identifying at least one software program associated with the file type used by the operating system for the data file. In one embodiment, the computer-implemented method may further include (1) in response to detecting an attempt to open the data file, identifying a set of calling processes that resulted in the attempt to open the data file, (2) determining, for each process in the set of calling processes, whether the process is trustworthy, and (3) performing the security action in response to detecting that one or more processes in the set of calling processes is not trustworthy.

In some examples, determining whether the process is trustworthy may include: (1) determining, based on the process not being included in the set of expected calling processes identified while monitoring the software program usage, that the process is not trustworthy, (2) determining whether executable code associated with the process is trustworthy by either or both of (a) determining whether the reputation of one or more files associated with the process indicates that the executable files are trustworthy and/or (b) determining whether executable code in memory is trustworthy by detecting whether the executable code includes malicious code, and (3) determining, based on executable code associated with the process not being trustworthy, that the process is not trustworthy.

In some examples, determining whether the reputation of the executable files indicates that the executable files are trustworthy may include (1) identifying a reputation score threshold that is indicative of whether files are trustworthy, (2) obtaining a reputation score for the one or more files by one or more of (a) obtaining a reputation score of an executable file on which the process is based and/or (b) obtaining a minimum reputation score of a file in a set of files loaded into memory by the process, and (3) determining, based on the reputation score being below the reputation score threshold, that the files are not trustworthy. In one embodiment, the security action may include (1) disabling the software program, (2) deleting the software program, (3) displaying a warning message that the software program has attempted to open the data file without permission, and/or (4) notifying an administrator that the software program has attempted to open the data file without permission.

In one embodiment, a system for implementing the above-described method may include several modules stored in memory, such as (1) a file identification module that identifies a data file to be protected against data loss, (2) a program identification module that identifies a set of software programs permitted to open the data file by (a) identifying a format of the data file and (b) identifying at least one software program capable of opening files having the format of the data file, (3) a detection module that detects an attempt to open the data file by a software program not included in the set of software programs, (4) a security module that performs a security action in response to detecting the attempt to open the data file, and (5) at least one physical processor configured to execute the file identification module, the program identification module, the detection module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a data file to be protected against data loss, (2) identify a set of software programs permitted to open the data file by (a) identifying a format of the data file and (b) identifying at least one software program capable of opening files having the format of the data file, (3) detect an attempt to open the data file by a software program not included in the set of software programs, and (4) perform a security action in response to detecting the attempt to open the data file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
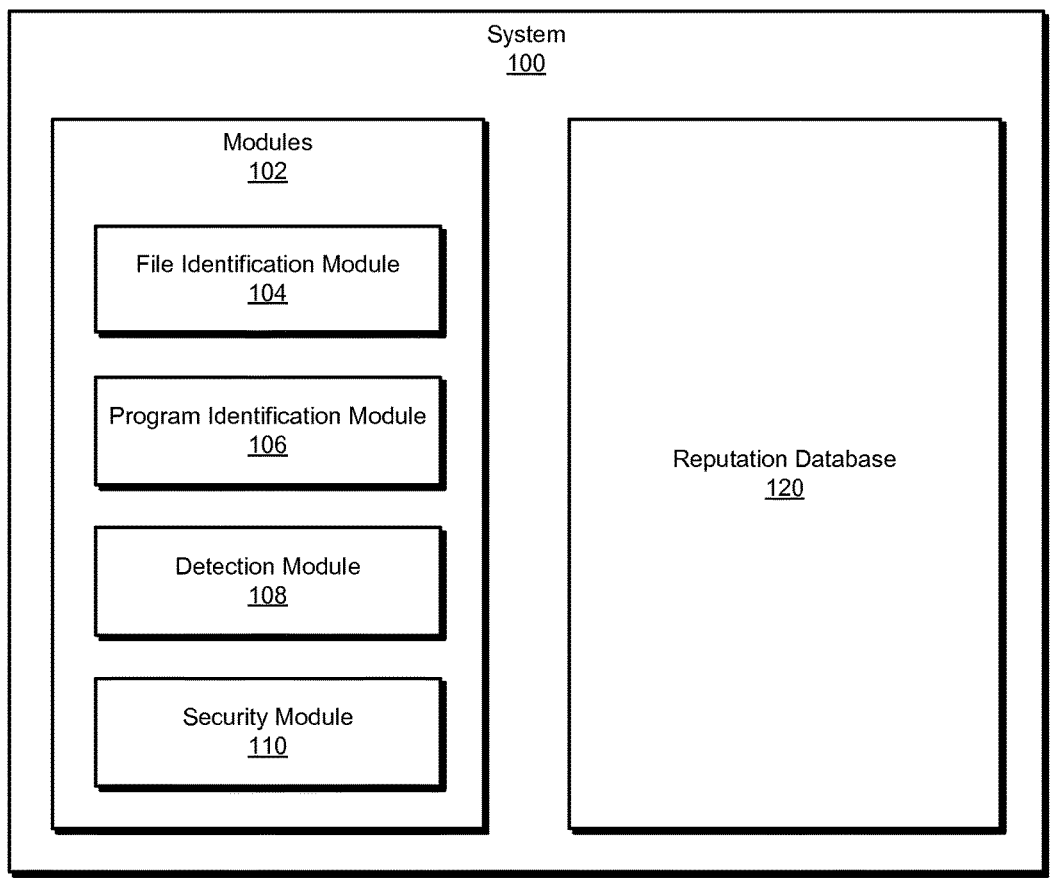
FIG. 1 is a block diagram of an exemplary system for protecting data files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting data files. As will be explained in greater detail below, the systems and methods described herein may protect data files by identifying software programs designed and/or authorized to open various types of data files and detecting when software programs attempt to open data files with which they are not associated. Even when the software programs opening data files are recognized as safe, systems and methods described here may detect when the safe programs are operating under the direction of unrecognized or suspicious processes. When systems and methods described herein detect an unauthorized software program or process attempting to open a data file, various security actions may be initiated to protect confidential data against theft.

Figure 2:
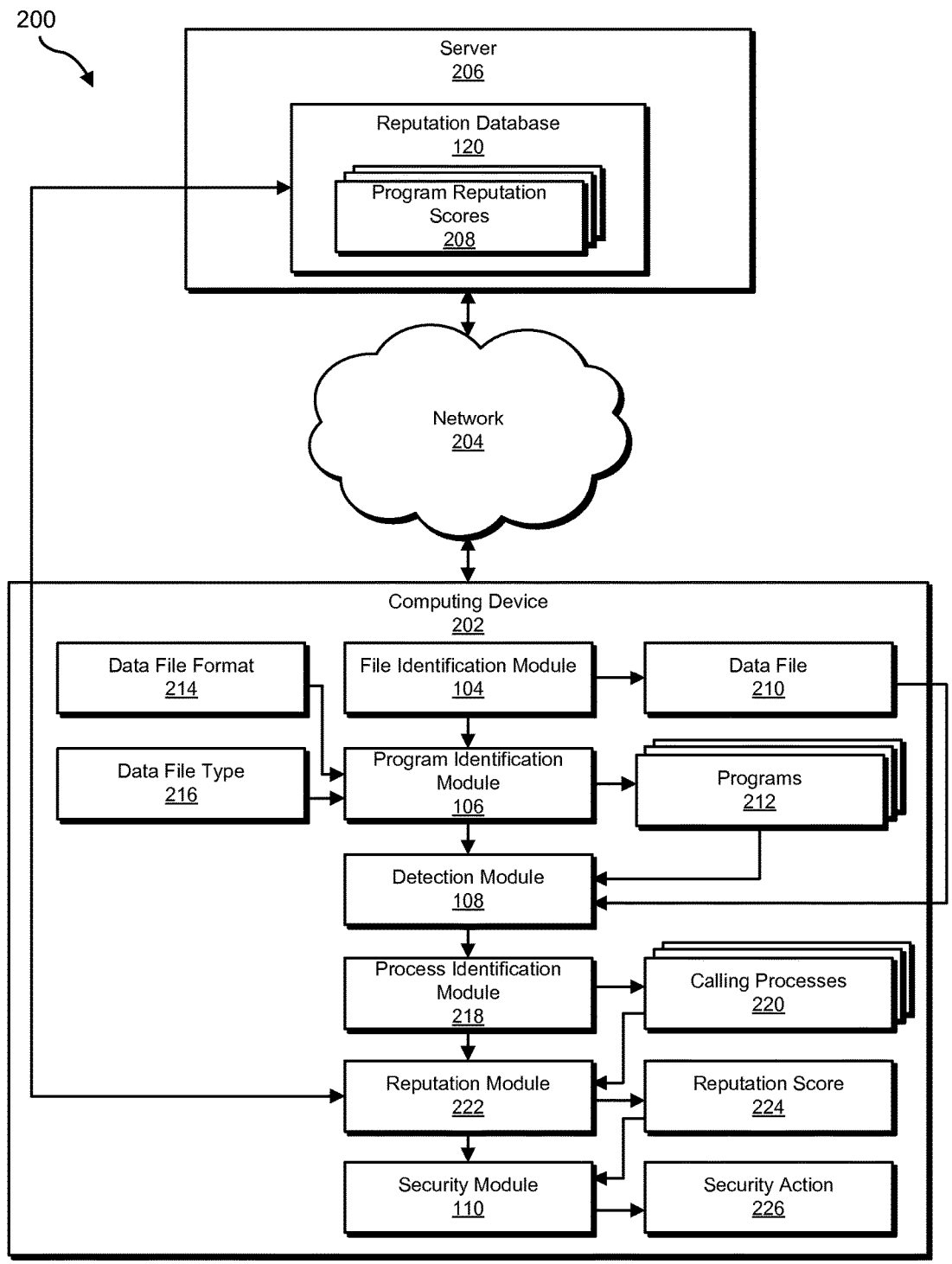
FIG. 2 is a block diagram of an additional exemplary system for protecting data files.
Figure 3:
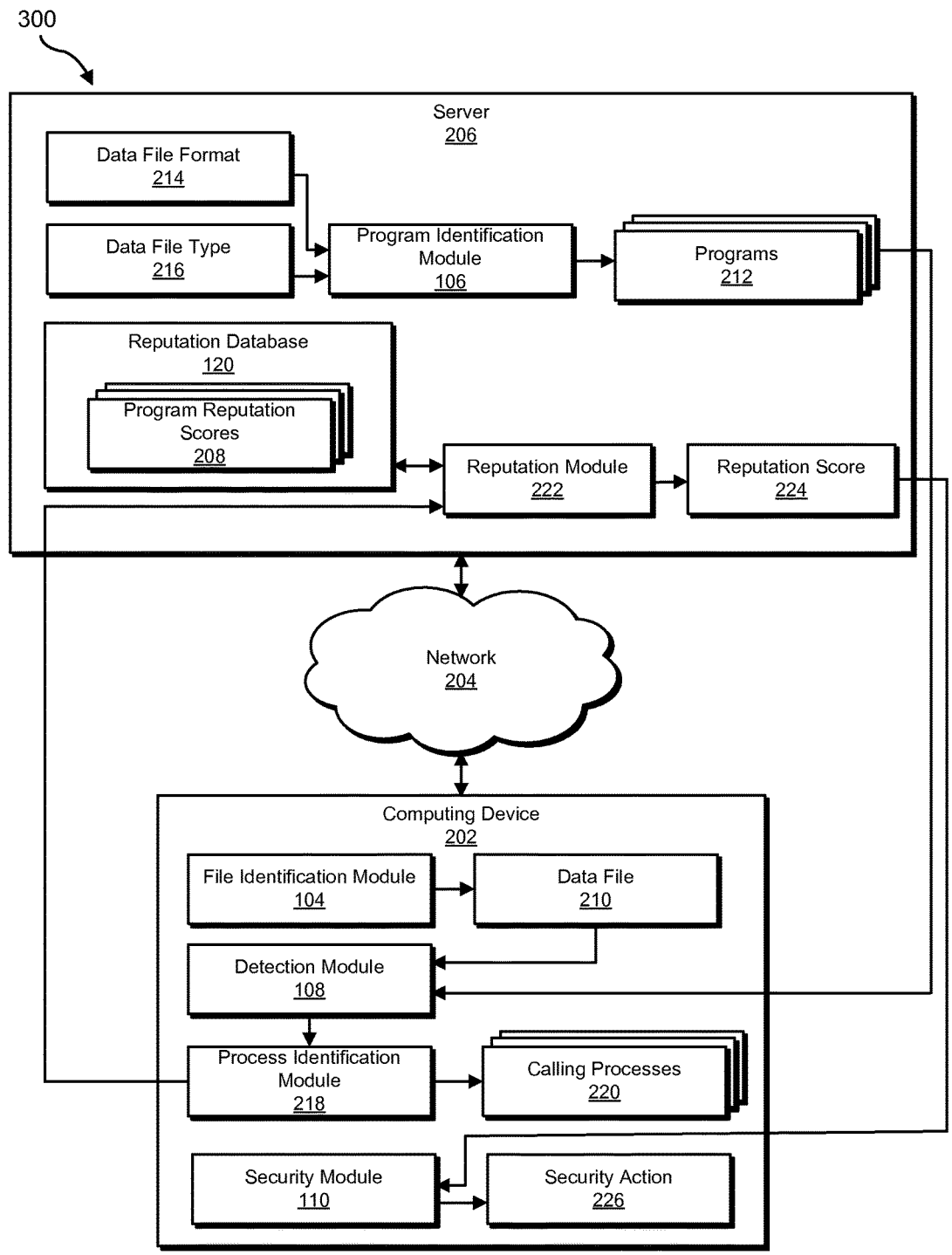
FIG. 3 is a block diagram of an exemplary server-oriented system for protecting data files.

The following will provide, with reference to FIGS. 1-3, detailed descriptions of exemplary systems for protecting data files. Detailed descriptions of corresponding computer-implemented methods will also be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for protecting data files. As illustrated in this figure, exemplary system 100 may include one or more modules 102 for performing one or more tasks. For example, and as will be explained in greater detail below, exemplary system 100 may include a file identification module 104 that may identify a data file to be protected against data loss. Exemplary system 100 may additionally include a program identification module 106 that may identify a set of software programs permitted to open the data file by identifying a format of the data file and identifying one or more software programs capable of opening files having the format of the data file.

Exemplary system 100 may also include a detection module 108 that may detect an attempt to open the data file by a software program not included in the set of software programs, as well as a security module 110 that may perform a security action in response to detecting the attempt to open the data file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as reputation database 120. In one example, reputation database 120 may be configured to store data indicating the trustworthiness of software programs. Reputation database 120 may represent portions of a single database or computing device or a plurality of databases or computing devices. For example, reputation database 120 may represent a portion of server 206 in FIG. 2, computing system 510 in FIG. 5, and/or portions of exemplary network architecture 600 in FIG. 6. Alternatively, reputation database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in reputation database 120. Additionally or alternatively, server 206 may be programmed with one or more of modules 102 and/or may store all or a portion of the data in reputation database 120.

In one embodiment, one or more of modules 102 from FIG. 1 may, when executed by at least one processor of computing device 202 and/or server 206, enable computing device 202 and/or server 206 to protect data files. For example, and as will be described in greater detail below, file identification module 104 may identify a data file 210 to be protected against data loss. Program identification module 106 may identify a set of software programs 212 permitted to open the data file by identifying a format 214 of the data file and identifying at least one software program 212 capable of opening files having the format of the data file. Detection module 108 may detect an attempt to open data file 210 by a software program not included in set of software programs 212.

As shown in FIG. 2, computing device 202 may also include process identification module 218 that may, in response to detecting the attempt to open data file 210, identify a set of calling processes 220 that resulted in the attempt to open data file 210. Reputation module 222 may retrieve, from reputation database 120 on server 206 for each of calling processes 220, a reputation score 224 that indicates whether the executable files on which each process is based and/or executable code in memory are trustworthy. In response to detecting the attempt to open the data file, or in response to detecting that a process in the set of calling processes 220 is not trustworthy, security module 110 may initiate security action 226.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of storing, comparing, and/or providing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a block diagram of an exemplary server-oriented system 300 capable of implementing one or more of the embodiments described and/or illustrated herein. FIG. 3 implements the same modules and other elements illustrated in FIG. 2, in a somewhat different configuration. Exemplary server-oriented system 300 separates client-oriented modules from server-oriented modules in a manner that may minimize processor and memory requirements of client computing device 202, and may reduce network communication between computing device 202 and server 206. Modules located on client computing device 202 may be directly involved in detecting an attempt to open a data file by an unauthorized software program, identifying the software program, and responding to the threat. These modules include file identification module 104, detection module 108, process identification module 218, and security module 110. Modules located on server 206 are closely associated with reputation database 120, which is also located on server 206. These modules include program identification module 106 and reputation module 222.

Although the modules of exemplary server-oriented system 300 are configured somewhat differently than exemplary system 200, shown in FIG. 2, the modules function in a similar manner. File identification module 104 may identify a data file 210 to be protected against data loss. Program identification module 106 may identify a set of software programs 212 permitted to open the data file by identifying a data file format 214 of the data file and identifying at least one software program 212 capable of opening files having the format of data file 210. Detection module 108 may detect an attempt to open data file 210 by a software program not included in set of software programs 212.

As shown in FIG. 3, computing device 202 may also include process identification module 218 that may, in response to detecting the attempt to open data file 210, identify a set of calling processes 220 that resulted in the attempt to open data file 210. Reputation module 222 on server 206 may retrieve from reputation database 120, for each of calling processes 220, a reputation score 224 that indicates whether the executable file on which each process is based, and/or executable code in memory is trustworthy. In response to detecting the attempt to open the data file, or in response to detecting that a process in the set of calling processes 220 is not trustworthy, security module 110 may initiate security action 226.

Another possible system configuration, similar to exemplary server-oriented computing system 300, may locate program identification module 106 and reputation module 222 on an application server running in a back-end facility with server 206. Server 206 may then act as a dedicated database server for reputation database 120.

Figure 4:
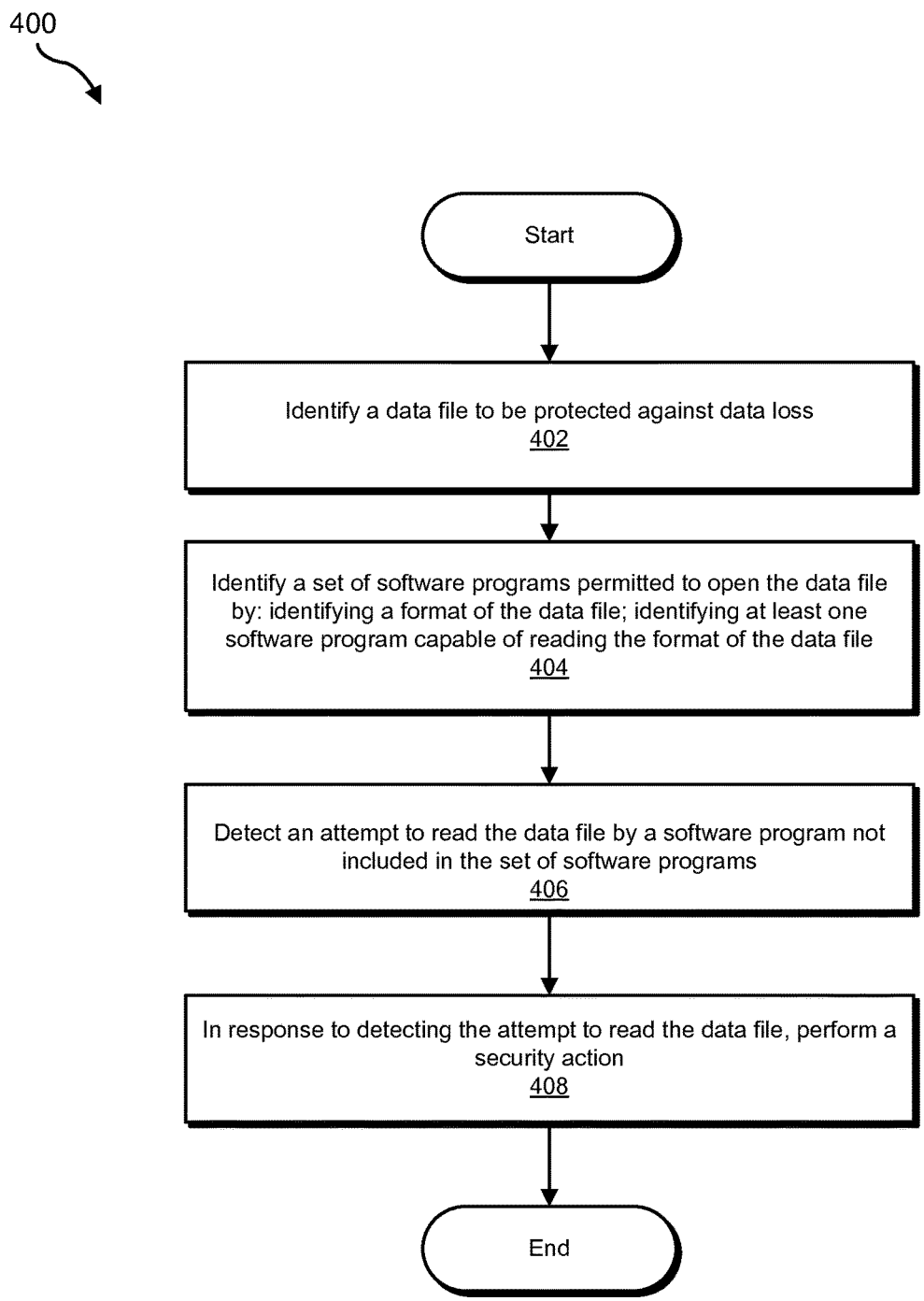
FIG. 4 is a flow diagram of an exemplary method for protecting data files.

FIG. 4 is a flow diagram of an exemplary computer-implemented method 400 for protecting data files. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 510 in FIG. 5, and/or portions of exemplary network architecture 600 in FIG. 6.

As illustrated in FIG. 4, at step 402 one or more of the systems described herein may identify a data file to be protected against data loss. For example, at step 402 file identification module 104 may, as part of computing device 202 in FIG. 2, identify data file 210 to be protected against data loss.

The term "data file," as used herein, generally refers any durable collection of data processed, maintained, and/or stored in computer-readable form. Additionally or alternatively, the phrase "data file" may refer to any durable collection of data that affects the state of a software program. A data file is durable in the sense that it remains accessible when the software program that created it is no longer executing. In one example, a text editor may create a file containing data representing alphanumeric text. In another example, a file may contain configuration data for a software program in the form of human-readable text, specifying information such as the location of resources used by the program. Data files may be stored on physical storage media, such as a magnetic disk drive (e.g., a so-called hard drive), a solid state drive, a floppy disk drive or the like, or on virtual storage that emulates physical media.

The phrase "data loss," as used herein, generally refers to unauthorized destruction, disclosure, or modification of data. Data loss may also include the modification of data files to facilitate the destruction, disclosure, or modification of data. For example, modifying a configuration file to grant read access to a valuable data file, so that the data file can be transmitted to an outside party, involves data loss both to the configuration file and to the valuable data.

File identification module 104 may identify the file to be protected against data loss in any suitable matter. For example, file identification module 104 may identify data files according to one or more criteria, such as data files of certain file formats, or data files created by a particular set of software programs, data files created or edited by a user of the computing device, or data files stored in a specific file system directory. File identification module 104 may also identify data files required by law or organizational policy to be protected against data loss.

At step 404 one or more of the systems described herein may identify a set of software programs permitted to open the data file by (1) identifying a format of the data file and (2) identifying at least one software program capable of opening data files having the format of the data file. For example, at step 404 program identification module 106 may, as part of computing device 202 in FIG. 2, identify a set of software programs 212 permitted to open data file 210 by identifying data file format 214 of data file 210 and identifying at least one software program 212 capable of opening one or more files having data file format 214.

The phrase "open a data file," as used herein, generally refers to reading the data file, writing the data file, modifying the data file, and/or accessing the data file in any other manner.

As used herein, the phrase "software program" generally refers to any type or form of executable code (i.e., sequence of computer-readable instructions). Software programs may include, without limitation, system software, application software, utility programs, productivity programs, entertainment programs, and/or any other types of computer applications.

The term "file format," as used herein, generally refers to the particular way in which data is encoded or stored within a file. In some examples, a file format may be specific to the software program that created the data file. In some examples, file formats may be designed to store particular types of data that may be read by several different software programs. Examples of such file formats (sometimes referred to as "basic file formats") include, without limitation, file formats designed to store text (e.g., .txt files, .pdf files, etc.), images (e.g., .gif files, .bmp files, etc.), audio (e.g., .mp3 files, .wma files, .aac files, etc.), and/or video (e.g., .mp4 files, .avi files, etc.). In other examples, file formats may specify how differing data elements may coexist within a single file and/or may combine a number of discrete files together into a single file. Examples of such file formats (sometimes referred to as "container file formats") include, without limitation, archive formats (e.g., .zip files, .rar files, etc.) and/or file formats designed to store multiple types of data (e.g., .docx files, .pptx files, .xlsx files, etc.).

Depending upon the operating system used to create a data file or the file system on which the file is stored, the format of a data file may be indicated by part of the file's name or by file metadata. In some examples, a file in a basic format may be encoded in a format understood by one specific software program or a group of software programs. For example, a computing device many contain many configuration files, with each configuration file containing text data that can be edited using a text editor, but with each configuration file containing configuration information specific to one software program. Several application programs that run on MICROSOFT WINDOWS, for example, use a file named setup.ini to store settings (such as the default language and location of font and localization files) to be used when installing that program. In another example, a data file may contain Extensible Markup Language (XML) data that can be opened, viewed, or edited using a text editor or XML editor, but in a standard format containing font, page layout, and document formatting data that may be decoded by any of several word processing programs written to support the standard format. For example, files with a .docx extension on MICROSOFT WINDOWS may be archived XML files in OFFICE OPEN XML format that describe the layout and contents of a document, and that can be edited using MICROSOFT WORD, OPENOFFICE WRITER, LIBREOFFICE WRITER, and other word processing programs.

Program identification module 106 may identify a set of software programs permitted to open the data file in a variety of ways. For example, program identification module 106 may identify the software program that created the data file. In some examples, program identification module 106 may identify the software program that created the data file based on the file type, as indicated by the file name or metadata. In other examples, program identification module 106 may identify the software program that created the data file by examining the format of data contained within the data file.

In some examples, program identification module 106 may identify the set of software programs by (1) monitoring software program usage of at least one user, and (2) while monitoring the software program usage (a) identifying a software program used by the user to open the data file and (b) identifying a set of expected calling processes that resulted in opening the data file. By monitoring software program usage, program identification module 106 may identify the software program used to create a data file as well as software programs subsequently used to view or edit the file contents. For some data file types, many programs may be used to create or edit data files of that type. For example, many programs may create or edit plain text files. By monitoring software program usage, program identification module 106 may introduce a behavioral aspect to data file protection provided by systems and methods described herein. For example, if program identification module 106 determines that a particular user always uses OPENOFFICE WRITER to edit word processing data files, program identification module 106 may not include other word processing programs in the set of software programs permitted to open word processing files, even though several other software programs may be capable of reading data files of that type. If another program attempts to open a word processing file as part of a targeted attack (as will be described in greater detail below), detection module 108 may detect that an attack is in process.

By observing program usage, program identification module 106 may also identify a set of expected calling processes that result in opening the data file. By identifying the chain of calling processes that result in opening the data file, program identification module 106 may identify not only the software program that ultimately opened the data file, but also the processes in the chain of calling processes that normally result in opening the data file. As will be described in greater detail below, once a set of normal calling processes has been identified, a subsequent variation in the chain of calling processes may indicate an attack is in progress.

In some examples, identifying the format of the data file may include: (1) identifying a file type for the data file, where the file type is used by an operating system of the computing device for the data file and (2) identifying the format of the data file by identifying a data file format associated with the file type. For example, on the MICROSOFT WINDOWS operating system, data files of the OFFICE OPEN XML file type may be recognized by a .docx extension on the file name. Data files on the APPLE MACINTOSH operating system use a similar method for identifying file types, but with the identifier stored as a 4-byte value in the data file's metadata. Program identification module 106 may use the file type of a data file to identify one or more software programs that are permitted to open data files of the format associated with the file type.

In some examples, identifying the set of software programs may include identifying at least one software program associated with the file type used by the operating system for the data file. Operating systems may maintain a list of associations between data file types and compatible software programs. For example, the MICROSOFT WINDOWS operating system may identify MICROSOFT WORD as the default program to be used when a user opens a file with a .doc extension for reading or editing. The method used by the APPLE MACINTOSH operating system is somewhat more complex. Each data file has separate 4-byte codes identifying the file type and the file creator. The creator code specifies the default program to use when opening the data file, while the file type code specifies the data type. In one example, program identification module 106 may include the default program for opening data files of each file type in the set of software programs permitted to open data files of each type.

At step 406 one or more of the systems described herein may detect an attempt to open the data file by a software program not included in the set of software programs. For example, at step 406 detection module 108 may, as part of computing device 202 in FIG. 2, detect an attempt to open data file 210 by a software program not included in the set of software programs 212. Detection module 108 may detect an attempt by an unauthorized software program to open a data file in any suitable manner. For example, detection module 108 may register an event handler for a file open event, using an application programming interface (API) provided by the operating system of the computing device.

After step 406, one or more of the systems described herein may, in response to detecting an attempt to open the data file, identify a set of calling processes that resulted in the attempt to open the data file. For example, process identification module 218 may, as part of computing device 202 in FIG. 2, in response to detection module 108 detecting an attempt to open data file 210, identify set of calling processes 220 that resulted in the attempt to open data file 210.

Process identification module 218 may identify a set of calling processes in any suitable manner. For example, process identification module 218 may use an operating system application programming interface (API) to identify the parent process of the software program that attempted to open the data file. Process identification module 218 may identify a chain of parent calling processes until it identifies the software program that initiated the process chain that resulted in the attempt to open the data file.

After process identification module 218 identifies one or more processes that resulted in an attempt to open a data file, one or more of the systems described herein may determine, based on a process not being included in the set of expected calling processes identified while monitoring software program usage, that the process is not trustworthy. When monitoring software program usage, program identification module 106 may identify a set of expected calling processes created when a user executes a software program and opens a data file. A targeted attack may involve the same software program, but the attack may be detected by the presence of a process not in the set of expected calling processes. For example, the unexpected process may, as part of the attack, use the software program to read the data file for the purpose of identifying valuable data and transmitting it to an outside party, or modify the data file for the purpose of weakening security systems.

After process identification module 218 identifies one or more processes that resulted in an attempt to open a data file, one or more of the systems described herein may retrieve reputation scores that indicate the trustworthiness of the executable files containing the executable code on which each of the identified processes is based, as well as reputation scores of any executable files or libraries (e.g., dynamic-link libraries (.DLL libraries)) loaded into memory by the processes. For example, reputation module 222 may, as part of computing device 202 in FIG. 2, retrieve a reputation score 224 indicating the trustworthiness of an executable file that contains executable code that created one or more of calling processes 220.

Reputation module 222 may also retrieve reputation scores 224 for any executable file or library loaded into memory by calling processes 220. Reputation module 222 may determine the reputation of each of calling processes 220 or all of calling processes 220 collectively, based on reputation scores 224 retrieved from reputation database 120. For example, reputation module 222 may calculate a reputation for each of the calling processes 220, based on the minimum or average reputation score of executable files or libraries associated with each process (either an executable file that created the process or executable files or libraries loaded into memory by the process). For example, a software program on a WINDOWS operating system may consist of a single .EXE file that, when executed, creates a process that creates several child processes. Each process may use functions included in one or more .DLL libraries, and one of the library functions may open a data file. In response to detecting the attempt to open the data file, reputation module 222 may retrieve the reputation scores for the .EXE file and each of the .DLL libraries, and determine whether the processes involved in opening the data file are trustworthy, based on the reputation scores retrieved.

In another example, reputation module 222 may determine a collective reputation for all calling processes 220, based on the minimum or average reputation scores of all executable files or libraries in the memory space of the calling processes 220. In another example, reputation module 222 may base the reputation of calling processes 220 at least in part on the detection of malicious code in memory that is not associated with an executable file. For example, malicious executable code may be found in heap memory, stack memory, or other allocated memory buffers.

Reputation module 222 may retrieve reputation score 224 from reputation database 120 located on server 206. Reputation module 222 may retrieve reputation information in a variety of ways. In one example, reputation module 222 may use a signature hash calculated by process identification module 218 to query for the reputation score.

The term "reputation," as used herein, generally refers to an indication of the trustworthiness, prevalence, prominence, community opinion, and/or reputation of a software application. A reputation may be based on a variety of factors, such as the percentage of devices or number of devices on which the software program is installed (e.g., prevalence of the software program in a wide area network, prevalence of the software program on the Internet, prevalence of the software program on devices and networks outside a local network, etc.), the length of time the software program has been in use on one or more devices, an indication of the reliability of the publisher or developer of the software program, an indication of the likelihood that the software program may contain malware, a community rating of the software program, an evaluation of the software program by a trusted entity, and/or any other suitable factor. Factors of a software program's reputation may be quantified, and two or more factors of a reputation score may be weighted and combined to yield a single numerical value or reputation score.

In one example, reputation module 222 may retrieve a reputation only for the executable file that, when executed, created the process that initiated the chain of processes that resulted in the attempt to open the data file, because the process that initiated the process chain is the process most likely to represent a targeted attack. However, because it is also possible for a process to insert itself in a chain of processes, reputation module 222 may, in another example, retrieve reputations for executable files associated with each of the calling processes in the calling process chain, both executable files that created processes and any executable files executed by running processes.

To determine the trustworthiness of the processes that resulted in the attempt to open the data file, reputation module 222 may identify or otherwise determine a reputation score threshold that is indicative of whether executable files are trustworthy. If the reputation score reputation module 222 retrieves for an executable file that created a process in the calling chain is below the reputation score threshold, reputation module 222 may indicate that security module 110 is to perform a security action.

At step 408 one or more of the systems described herein may, in response to detecting an attempt to open the data file, perform a security action. For example, at step 408 security module 110 may, as part of computing device 202 in FIG. 2 and in response to detection module 108 detecting an attempt to open data file 210, perform security action 226. The security action may also be initiated in response to detecting that a process that resulted in the attempt to open the data file is not trustworthy. For example, at step 408 security module 110 may, as part of computing device 202 in FIG. 2, in response to detecting that an executable file that created a process in the set of calling processes 220 has a reputation score 224 indicating that the executable file (and therefore the process based on the executable file) is not trustworthy, perform security action 226.

Security module 110 may perform a variety of security actions. For example, security module 110 may disable the software program that attempted to open the data file. Alternatively, security module 110 may delete the software program or move it to a quarantine subdirectory for further analysis by anti-malware programs. Additionally or alternatively, security module 110 may display a warning message to the user of the computing device that the software program has attempted to open the data file without permission, and/or notify an administrator of the unauthorized attempt to open the data file. The security action taken may vary, depending on the severity of the perceived threat. For example, if the chain of processes that resulted in a data file being opened includes several programs not in the set of expected calling processes associated with the data file format, security module 110 may display a warning message to the user. If reputation module 222 determines that the unexpected programs have low reputations, security module 110 may block access to the data file.

As explained above, the systems and methods described herein may protect data files against malware and targeted threats by identifying software programs authorized to open data files of an associated file type or format. Where a data file is of a basic type that can be opened and read by several different software programs, systems and methods described herein may further identify the format of data in the data file and restrict permission to open the data file only to the software program with which the file is associated. Systems and methods described herein may also identify software program/data file associations based on user behavior, so that a targeted threat may be detected even when it employs a legitimate and compatible software program, if that program is not in line with previously-demonstrated user behavior.

Systems and methods described herein may detect sophisticated targeted threats that attempt to hide their actions by using legitimate software programs by examining the chain of calling processes that resulted in an attempt to open a data file, and verifying the reputation of processes in the calling chain. Systems and methods described herein may also detect attempts to open data files by unauthorized software programs, and respond by taking appropriate security actions. Utilizing the techniques described above, the systems and methods described herein may detect sophisticated and previously-unidentified targeted threats designed to evade detection by other malware detection systems.

Figure 5:
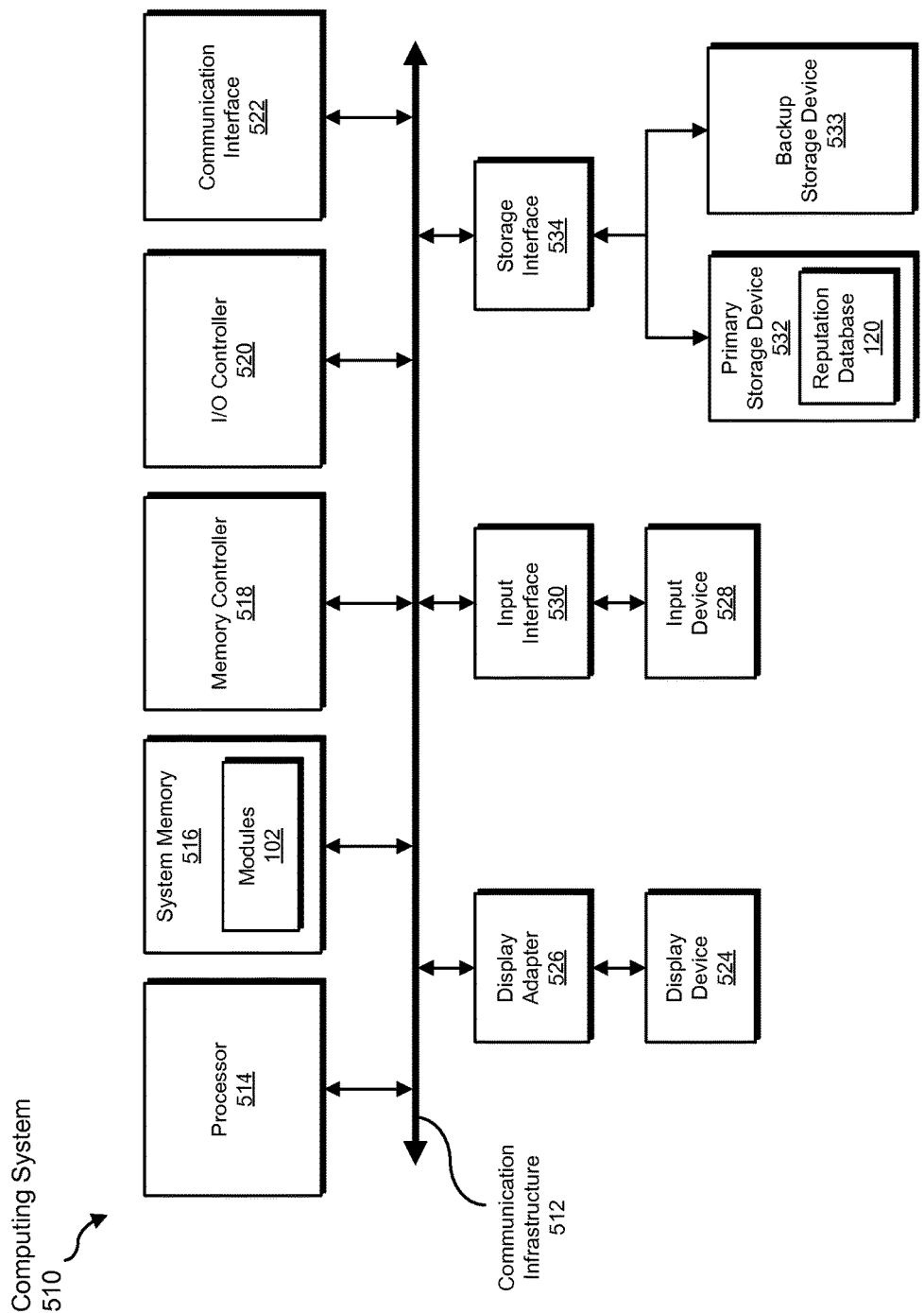
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 4). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, reputation database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
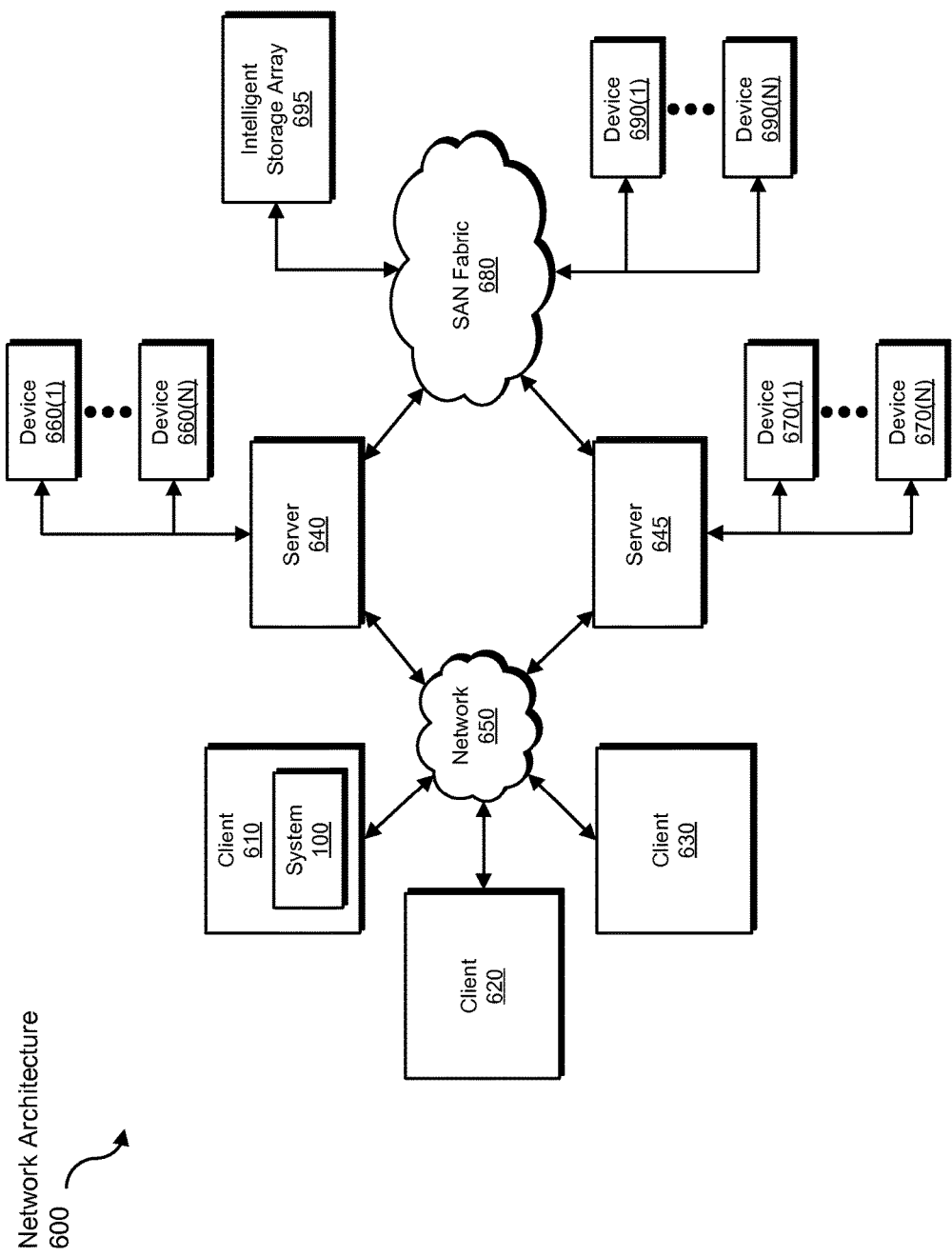
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 4). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for protecting data files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data file and software program data to be transformed, transform the data, and use the result of the transformation to detect unauthorized software programs attempting to open the data files. Modules described herein may also transform a physical computing system into a system for protecting data files. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting data files, at least a portion of the method being performed by a computing device comprising at least one processor, the method comprising:
    identifying, by a file identification module, a data file to be protected against data loss;
    identifying, by a program identification module, a software program preferred by a user to open data files with a format of the data file by:
        identifying a set of legitimate software programs designed to open files having the format of the data file; and
        determining, by monitoring attempts by the user to open data files with the format of the data file, that the user more frequently opens data files with the format of the data file using a particular software program within the set of legitimate software programs than at least one additional software program within the set of legitimate software programs;
    detecting, by a detection module, a potentially illegitimate attempt to open the data file by:
        detecting an attempt to open the data file by a software program within the set of legitimate software programs other than the software program preferred by the user; and
        determining, based on the software program attempting to open the data file being within the set of legitimate software programs but not being the software program preferred by the user, that the software program is potentially attempting to access confidential data within the data file; and
    in response to detecting the potentially illegitimate attempt to open the data file, performing, by a security module, a security action to prevent the software program from opening the data file.

2. The computer-implemented method of claim 1, wherein identifying the set of legitimate software programs comprises identifying a software program that created the data file.

3. The computer-implemented method of claim 1, wherein identifying the software program preferred by the user to open data files with the format of the data file further comprises:
    while monitoring the attempts by the user to open data files with the format of the data file:
        identifying a software program used by the user to open the data file; and
        identifying a set of expected calling processes that resulted in opening the data file.

4. The computer-implemented method of claim 1, wherein identifying the format of the data file comprises:
    identifying a file type for the data file, wherein the file type is used by an operating system of the computing device for the data file; and
    identifying the format of the data file by identifying a data file format associated with the file type.

5. The computer-implemented method of claim 4, wherein identifying the set of legitimate software programs comprises identifying at least one software program associated with the file type used by the operating system for the data file.

6. The method of claim 5, wherein identifying the software program associated with the file type used by the operating system for the data file comprises identifying a default software program automatically used by the operating system to open data files with the file type.

7. The computer-implemented method of claim 3, further comprising:
    in response to detecting the attempt to open the data file, identifying a set of calling processes that resulted in the attempt to open the data file;
    determining, for each process in the set of calling processes, whether the process is trustworthy; and
    performing the security action in response to detecting that one or more processes in the set of calling processes is not trustworthy.

8. The computer-implemented method of claim 7, wherein determining whether the process is trustworthy comprises at least one of:
    determining, based on the process not being included in the set of expected calling processes identified while monitoring the attempts by the user to open data files with the format of the data file, that the process is not trustworthy; and
    determining whether one or more files associated with the process is trustworthy by at least one of:
        determining whether a reputation of the one or more files associated with the process indicates that the one or more files are trustworthy;
        determining whether executable code in memory is trustworthy by detecting whether the executable code includes malicious code; and
        determining, based on executable code associated with the process not being trustworthy, that the process is not trustworthy.

9. The computer-implemented method of claim 8, wherein determining whether the reputation of the one or more files indicates that the one or more files are trustworthy comprises:
   identifying a reputation score threshold that is indicative of whether files are trustworthy;
   obtaining a reputation score for the one or more files by at least one of:
      obtaining a reputation score of an executable file on which the process is based; and
      obtaining a minimum reputation score of a file in a set of files loaded into memory by the process; and
   determining, based on the reputation score being below the reputation score threshold, that the one or more files are not trustworthy.

10. The computer-implemented method of claim 1, wherein the security action comprises at least one of:
   disabling the software program;
   deleting the software program;
   displaying a warning message that the software program has attempted to open the data file without permission; and
   notifying an administrator that the software program has attempted to open the data file without permission.

11. The method of claim 1, wherein monitoring the attempts by the user to open data files with the format of the data file comprises monitoring a plurality of successive attempts by the user to open data files with the format of the data file.

12. A system for protecting data files, the system comprising:
   a file identification module, stored in memory, that identifies a data file to be protected against data loss;
   a program identification module, stored in memory, that identifies a software program preferred by a user to open data files with a format of the data file by:
      identifying a set of legitimate software programs designed to open files having the format of the data file; and
      determining, by monitoring attempts by the user to open data files with the format of the data file, that the user more frequently opens data files with the format of the data file using a particular software program within the set of legitimate software programs than at least one additional software program within the set of legitimate software programs;
   a detection module, stored in memory, that detects a potentially illegitimate attempt to open the data file by:
      detecting an attempt to open the data file by a software program within the set of legitimate software programs other than the software program preferred by the user; and
      determining, based on the software program attempting to open the data file being within the set of legitimate software programs but not being the software program preferred by the user, that the software program is potentially attempting to access confidential data within the data file;
   a security module, stored in memory, that in response to detecting the potentially illegitimate attempt to open the data file, performs a security action to prevent the software program from opening the data file; and
   at least one physical processor configured to execute the file identification module, the program identification module, the detection module, and the security module.

13. The system of claim 12, wherein the program identification module identifies the set of legitimate software programs by identifying a software program that created the data file.

14. The system of claim 12, wherein the program identification module further identifies the software program preferred by the user to open data files with the format of the data file by:
   while monitoring the attempts by the user to open data files with the format of the data file:
      identifying a software program used by the user to open the data file; and
      identifying a set of expected calling processes that resulted in opening the data file.

15. The system of claim 14:
   further comprising:
      a process identification module, stored in memory, that in response to detecting the attempt to open the data file, identifies a set of calling processes that resulted in the attempt to open the data file;
      a reputation module, stored in memory, that determines, for each process in the set of calling processes, whether the process is trustworthy; and
   wherein the security module is further configured to perform the security action in response to detecting that the process in the set of calling processes is not trustworthy.

16. The system of claim 15, wherein the reputation module determines whether the process is trustworthy by at least one of:
   determining, based on the process not being included in the set of expected calling processes identified while monitoring the attempts by the user to open data files with the format of the data file, that the process is not trustworthy; and
   determining whether one or more files associated with the process is trustworthy by at least one of:
      determining whether a reputation of the one or more files associated with the process indicates that the one or more files are trustworthy;
      determining whether executable code in memory is trustworthy by detecting whether the executable code includes malicious code; and
      determining, based on executable code associated with the process not being trustworthy, that the process is not trustworthy.

17. The system of claim 16, wherein the reputation module determines whether the reputation of the one or more files indicates that the one or more files are trustworthy by:
   identifying a reputation score threshold that is indicative of whether files are trustworthy;
   obtaining a reputation score for the one or more files by at least one of:
      obtaining a reputation score of an executable file on which the process is based; and
      obtaining a minimum reputation score of a file in a set of files loaded into memory by the process; and
   determining, based on the reputation score being below the reputation score threshold, that the one or more files are not trustworthy.

18. The system of claim 12, wherein the program identification module identifies the format of the data file by:
   identifying a file type for the data file, wherein the file type is used by an operating system of a computing device where the data file is stored; and identifying the format of the data file by identifying a data file format associated with the file type.

19. The system of claim 18, wherein the program identification module identifies the set of legitimate software programs by identifying at least one software program associated with the file type used by the operating system for the data file.

20. A non-transitory computer-readable medium comprising one or more computer-readable instructions that, when executed by at least one processor of a computing device, cause the computing device to:
- identify a data file to be protected against data loss;
- identify a software program preferred by a user to open data files with a format of the data file by:
  - identifying a set of legitimate software programs designed to open files having the format of the data file; and
  - determining, by monitoring attempts by the user to open data files with the format of the data file, that the user more frequently opens data files with the format of the data file using a particular software program within the set of legitimate software programs than at least one additional software program within the set of legitimate software programs;
- detect a potentially illegitimate attempt to open the data file by:
  - detecting an attempt to open the data file by a software program within the set of legitimate software programs other than the software program preferred by the user; and;
  - determining, based on the software program attempting to open the data file being within the set of legitimate software programs but not being the software program preferred by the user, that the software program is potentially attempting to access confidential data within the data file; and
- in response to detecting the potentially illegitimate attempt to open the data file, perform a security action to prevent the software program from opening the data file.

* * * * *